United States Patent
Miyamoto (10) Patent No.: US 11,860,452 B2
(45) Date of Patent: Jan. 2, 2024

(54) SPECTACLE LENS AND SPECTACLES (71) Applicant: HOYA LENS THAILAND LTD., Pathumthani (TH)

(72) Inventor: Sou Miyamoto, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 343 days.

(21) Appl. No.: 17/105,792

(22) Filed: Nov. 27, 2020

(65) Prior Publication Data

US 2021/0199988 A1    Jul. 1, 2021

Related U.S. Application Data (63) Continuation of application No. PCT/JP2019/025225, filed on Jun. 25, 2019.

(30) Foreign Application Priority Data

Jun. 29, 2018    (JP) .................... 2018-124673

(51) Int. Cl.
*G02C 7/02* (2006.01)
*G02B 5/26* (2006.01)
*G02C 7/10* (2006.01)

(52) U.S. Cl.
CPC .............. *G02C 7/02* (2013.01); *G02B 5/26* (2013.01); *G02C 7/104* (2013.01)

(58) Field of Classification Search
CPC . G02C 7/02; G02C 7/104; G02C 7/10; G02B 5/26; G02B 1/115

See application file for complete search history.

(56) References Cited

U.S. PATENT DOCUMENTS

| | | |
|---|---|---|
| 2002/0024705 A1 | 2/2002 | Nakano |
| 2013/0038834 A1 | 2/2013 | Cado et al. |
| 2015/0198821 A1 | 7/2015 | Miyamoto et al. |
| 2016/0124118 A1 | 5/2016 | Takahashi |
| 2017/0023797 A1 | 1/2017 | Cado et al. |
| 2017/0075040 A1 | 3/2017 | Bolshakov et al. |
| 2017/0235020 A1* | 8/2017 | Bolshakov ............ G02C 7/107 351/159.01 |

(Continued)

FOREIGN PATENT DOCUMENTS

| | | |
|---|---|---|
| CN | 103329013 A | 9/2013 |
| CN | 105378512 A | 3/2016 |

(Continued)

OTHER PUBLICATIONS

Jun. 27, 2022 Office Action issued in Korean Patent Application No. 10-2020-7036466.

(Continued)

*Primary Examiner* — Darryl J Collins
*Assistant Examiner* — Matthew Y Lee
(74) *Attorney, Agent, or Firm* — Oliff PLC (57) ABSTRACT

The spectacle lens has at least a lens base material, and a multilayer film positioned on an eyeball-side surface of the lens base material, in which an average reflectance Rm (280-380) in a wavelength region of 280 to 380 nm, measured on the eyeball-side surface of the spectacle lens, is 10.0% or less, and a chroma C*, measured on the eyeball-side surface of the spectacle lens under a CIE standard illuminant D65, is 0.5 or more but 5.0 or less.

6 Claims, 9 Drawing Sheets

(56) References Cited

U.S. PATENT DOCUMENTS

2017/0299896 A1  10/2017  Ogo et al.
2018/0321514 A1  11/2018  Carrega et al.

FOREIGN PATENT DOCUMENTS

| | | |
|---|---|---|
| CN | 106662671 A | 5/2017 |
| CN | 107003545 A | 8/2017 |
| CN | 107636495 A | 1/2018 |
| CN | 108351536 A | 7/2018 |
| JP | 2013-545145 A | 12/2013 |
| WO | 2012/076714 A1 | 6/2012 |
| WO | 2014/050930 A1 | 4/2014 |
| WO | 2014/208412 A1 | 12/2014 |
| WO | 2015/029644 A1 | 3/2015 |
| WO | 2016/026808 A1 | 2/2016 |
| WO | 2016/088763 A1 | 6/2016 |
| WO | 2016/146153 A1 | 9/2016 |
| WO | 2017/077358 A1 | 5/2017 |

OTHER PUBLICATIONS

Sep. 24, 2019 International Search Report issued in International Patent Application No. PCT/JP2019/025225.

Dec. 29, 2020 International Preliminary Report on Patentability issued in International Patent Application No. PCT/JP2019/025225.

Feb. 18, 2022 extended Search Report issued in European Patent Application No. 19826077.0.

Mar. 28, 2022 Office Action issued in Chinese Patent Application No. 21980035711.3.

Jul. 19, 2022 Office Action issued in Japanese Patent Application No. 2018-124673.

Sep. 7, 2022 Office Action issued in Chinese Patent Application No. 201980035711.3.

Dec. 13, 2022 Office Action issued in Korean Patent Application No. 10-2020-7036466.

Feb. 28, 2023 Office Action issued in Japanese Application No. 2018-124673.

* cited by examiner

| | Sample 1 | | | | | | Sample 2 | | | | | | Sample 3 | | | | | | Sample 4 | | | | |
|---|---|---|---|---|---|---|---|---|---|---|---|---|---|---|---|---|---|---|---|---|---|---|---|
| Subject | Ex.1 | Ex.2 | Ex.3 | Comp. Ex.1 | Comp. Ex.2 | Subject | Ex.1 | Ex.2 | Ex.3 | Comp. Ex.1 | Comp. Ex.2 | Subject | Ex.1 | Ex.2 | Ex.3 | Comp. Ex.1 | Comp. Ex.2 | Subject | Ex.1 | Ex.2 | Ex.3 | Comp. Ex.1 | Comp. Ex.2 |
| A | 5 | 3 | 4 | 1 | 2 | A | 5 | 3 | 4 | 1 | 2 | A | 5 | 3 | 2 | 4 | 1 | A | 5 | 3 | 2 | 4 | 1 |
| B | 5 | 3 | 4 | 1 | 2 | B | 5 | 3 | 4 | 1 | 2 | B | 5 | 3 | 4 | 1 | 2 | B | 5 | 3 | 4 | 1 | 2 |
| C | 5 | 3 | 4 | 1 | 2 | C | 5 | 3 | 4 | 1 | 2 | C | 4 | 5 | 3 | 1 | 2 | C | 4 | 5 | 3 | 1 | 2 |
| D | 5 | 3 | 4 | 1 | 2 | D | 5 | 3 | 4 | 1 | 2 | D | 4 | 3 | 5 | 1 | 2 | D | 4 | 3 | 5 | 1 | 2 |
| E | 5 | 4 | 3 | 1 | 2 | E | 5 | 4 | 3 | 1 | 2 | E | 5 | 4 | 3 | 1 | 2 | E | 5 | 4 | 3 | 1 | 2 |
| F | 5 | 3 | 4 | 1 | 2 | F | 5 | 3 | 4 | 1 | 2 | F | 4 | 3 | 5 | 2 | 1 | F | 4 | 3 | 5 | 2 | 1 |
| G | 5 | 4 | 3 | 2 | 1 | G | 5 | 4 | 3 | 2 | 1 | G | 5 | 4 | 3 | 2 | 1 | G | 5 | 4 | 3 | 2 | 1 |
| H | 5 | 4 | 3 | 1 | 2 | H | 5 | 4 | 3 | 1 | 2 | H | 4 | 3 | 5 | 1 | 2 | H | 4 | 3 | 5 | 1 | 2 |
| I | 5 | 3 | 4 | 1 | 2 | I | 5 | 3 | 4 | 1 | 2 | I | 4 | 3 | 5 | 2 | 1 | I | 4 | 3 | 5 | 2 | 1 |
| J | 5 | 3 | 4 | 1 | 2 | J | 5 | 3 | 4 | 1 | 2 | J | 4 | 5 | 3 | 1 | 2 | J | 4 | 5 | 3 | 1 | 2 |
| Average | 5 | 3.3 | 3.7 | 1.1 | 1.9 | Average | 5 | 3.3 | 3.7 | 1.1 | 1.9 | Average | 4.4 | 3.6 | 3.8 | 1.6 | 1.6 | Average | 4.4 | 3.6 | 3.8 | 1.6 | 1.6 |

SPECTACLE LENS AND SPECTACLES

CROSS-REFERENCE TO RELATED APPLICATIONS

This application is a Continuation of PCT International Application No. PCT/JP2019/025225 filed on Jun. 25, 2019, which was published under PCT Article 21(2) in Japanese. The above application is hereby expressly incorporated by reference, in its entirety, into the present application.

TECHNICAL FIELD

The present disclosure relates to a spectacle lens and spectacles that are provided with the above spectacle lens.

BACKGROUND ART

Spectacle lenses are generally produced by forming, on the surface of a lens base material, a functional film for imparting desired functions to the spectacle lens. As such a functional film, a multilayer film is provided on the surface of the lens base material (see, for example, PTL 1).
PTL 1: WO 2015/029644

SUMMARY OF INVENTION

In recent years, various products featuring diverse functions have been proposed and sold in the spectacle lens market. Desirable features for the purpose of launching spectacle lenses that have higher added value in the market include a lower burden on the eyes of a spectacle wearer (favorable wearing feeling). Another feature is a favorable appearance of the spectacle lenses.

One aspect of the present disclosure is to provide a spectacle lens that can confer a favorable wearing feeling to a spectacle wearer, and that has a favorable appearance.

One aspect of the present disclosure relates to a spectacle lens having at least a lens base material, and a multilayer film positioned on an eyeball-side surface of the lens base material, wherein an average reflectance Rm (280-380) in a wavelength region of 280 to 380 nm, measured on the eyeball-side surface of the spectacle lens, is 10.0% or less, and a chroma C*, measured on the eyeball-side surface of the spectacle lens under a CIE standard illuminant D65, is 0.5 or more but 5.0 or less.

According to one aspect of the present disclosure, it is possible to provide a spectacle lens that is capable of conferring a favorable wearing feeling to a spectacle wearer and has a favorable appearance, and also provide spectacles that have the spectacle lens.

DESCRIPTION OF EMBODIMENTS

Definitions and/or measurement methods of the terms in the present disclosure and the present description will be explained below.

The term "eyeball-side surface" is a surface positioned on the eyeball-side at a time where the wearer is wearing the spectacles provided with the spectacle lens. The term "object-side surface" is the surface on the side opposite thereto, i.e. the surface positioned on the object side at a time where the wearer is wearing spectacles that are provided with the spectacle lens.

The term "chroma C*" is C* in the L*C*h color space defined in CIE 1964 (International Commission on Illumination), and is a value measured under a CIE standard illuminant D65. Further, the below-described hue angle h is h in the above L*C*h color space, and is a value measured under a CIE standard illuminant D65.

The reflectance measured on the surface of the spectacle lens is reflectance towards light that is directly incident on that surface (i.e. for an incidence angle of 0°). The reflectance can be measured, for example, at a pitch of 1 to 5 nm. The average reflectance at a given wavelength region is the arithmetic mean of reflectance measured in that wavelength region.

The term "luminous reflectance Rv" is a value measured in accordance with JIS T 7334:2011.

The term "film thickness" set forth in the present description is a physical film thickness. The film thickness can be measured in accordance with a known film thickness measurement method. For example, film thickness can be measured by converting the optical film thickness, measured by an optical film thickness measuring device, to physical film thickness.

[Spectacle Lens]

A spectacle lens according to one aspect of the present disclosure will be described in more detail below.

<Physical Properties Measured on Eyeball-Side Surface of Spectacle Lens>

The spectacle lens has an average reflectance Rm (280-380) of 10.0% or less in the wavelength region of 280 to 380 nm, measured on the eyeball-side surface of the spectacle lens, and has a chroma C* of 0.5 or more but 5.0 or less, measured on the eyeball-side surface of the spectacle lens under a CIE standard illuminant D65.

When reflectance of the object-side surface of the spectacle lens towards light that is incident on the spectacle lens from behind the spectacle wearer is high, a substantial amount of that light is reflected and strikes the eyes of the spectacle wearer. Among light in various wavelength regions, ultraviolet rays have intense energy by virtue of being short-wavelength light. When a large amount of such light is reflected after striking the eyeball-side surface of the spectacle lens from behind the spectacle wearer, a significant amount of ultraviolet rays become incident on the eyes of the spectacle wearer, which puts a substantial burden on the eyes. The wearing feeling that is perceived by the spectacle wearer worsens as a result. By contrast, the above spectacle lens has an average reflectance Rm (280-380) of 10.0% or less in the wavelength region of 280 to 380 nm, which is the wavelength region of ultraviolet rays, and hence reflection of ultraviolet rays on the eyeball-side surface can be curtailed. The above spectacle lens allows as a result reducing the amount of ultraviolet rays that strike the eyes of the wearer through reflection on the eyeball-side surface, and accordingly allows conferring a favorable wearing feeling by reducing the burden on the eyes of the wearer of spectacles having the spectacle lens.

However, conventional spectacle lenses, in which the reflectance towards ultraviolet rays on the eyeball-side surface is kept low, exhibit an appearance that is discomforting to the spectacle wearer and/or to an observer whole is gazing at the spectacles, for example, when facing the spectacle wearer. As a result of diligent research aimed at improving on such defective appearance, the inventor found that the appearance of the spectacle lens can be improved by prescribing a range of 0.5 or more but 5.0 or less for the chroma C*, measured under a CIE standard illuminant D65, on the eyeball-side surface of a spectacle lens having an average reflectance Rm (280-380) of 10.0% or less.

As a result, the above spectacle lens can exhibit a favorable appearance, and can confer a favorable wearing feeling to the spectacle wearer.

(Average Reflectance Rm (280-380))

The average reflectance Rm (280-380) measured on the eyeball-side surface of the spectacle lens is 10.0% or less; from the viewpoint of conferring a yet better wearing feeling to the spectacle wearer, the average reflectance Rm (280-380) can be 9.0% or less, 8.0% or less, 7.0% or less, 6.0% or less, 5.0% or less, or 4.0% or less. The average reflectance Rm (280-380) measured on the eyeball-side surface of the spectacle lens can be, for example, 0.5% or more, or 1.0% or more. Herein the lower the average reflectance Rm (280-380) measured on the eyeball-side surface, the greater is the extent of achievable reduction in the amount of ultraviolet rays reflected on the eyeball-side surface and that strike the eyes of the wearer, which is preferable; therefore, the lower limit of the average reflectance Rm (280-380) is not restricted to the values illustrated above.

(Chroma C*)

The chroma C* measured on the eyeball-side surface of the spectacle lens is 0.5 or more but 5.0 or less. The inventor newly found out that the chroma C* tends to be high in conventional spectacle lenses where the reflectance of ultraviolet rays on the eyeball-side surface is kept low. Spectacle lenses having high chroma C* tend to exhibit vivid reflection colors, which the inventor deemed to be a cause of discomfort to the wearer and to observers. By contrast, the above spectacle lens having a chroma C* of 0.5 or more but 5.0 or less can exhibit a favorable appearance with little such discomfort, or with no such discomfort. From the viewpoint of yet further improving appearance, the chroma C* measured on the eyeball-side surface of the spectacle lens can be 4.8 or less, 4.5 or less, 4.3 or less, or 4.0 or less. The chroma C* measured on the eyeball-side surface of the spectacle lens is 0.5 or more, and, for example, can be 1.0 or more, or 2.0 or more.

(Hue Angle h)

In one aspect, the spectacle lens can have a hue angle h, measured on the eyeball-side surface of the spectacle lens under a CIE standard illuminant D65, of 180.0 degrees or more but 300.0 degrees or less, or of 200.0 degrees or more but 280.0 degrees or less. The hue angle h lies in the above can range in order for the spectacle lens to exhibit yet better appearance.

The multilayer film provided on the eyeball-side surface of the lens base material can impart the above-described various physical properties to the eyeball-side surface of the spectacle lens. In one aspect, the layer configuration of the multilayer film can be established through film design in accordance with a known method (for example, optical simulation). In one aspect, film design can be performed so as to elicit the reflection properties below, to bring out an average reflectance Rm (280-380) and chroma C* lying in the above ranges, or to further bring out a hue angle h lying the above range, on the eyeball-side surface.

The maximum reflectance Rmax (450-700) in the wavelength region of 450 to 700 nm, measured on the surface of the eyeball-side surface of the spectacle lens, can be 3.0% or less, or 2.5% or less, or 2.0% or less. The maximum reflectance Rmax (450-700) can be, for example, 1.0% or more, or 1.2% or more, or 1.5% or more.

A minimum reflectance Rmin (450-700) in a wavelength region of 450 to 700 nm, measured on the eyeball-side surface of the spectacle lens, can be 0.5% or more, or 0.6% or more, or 0.7% or more, or 0.8% or more. The minimum reflectance Rmin (450-700) can be, for example, 1.0% or less, or 0.9% or less.

The average reflectance Rm (450-700) in the wavelength region of 450 to 700 nm, measured on the eyeball-side surface of the spectacle lens, can be 1.0% or more but 1.5% or less. The average reflectance Rm (450-700) can be 1.4% or less, or 1.3% or less. The average reflectance Rm (450-700) can be 1.1% or more, or 1.2% or more.

<Lens Base Material>

The lens base material included in the spectacle lens can be a plastic lens base material or a glass lens base material. The glass lens base material can be, for example, a lens base material made of inorganic glass. The lens base material can be a plastic lens base material, in terms of being lightweight and hard to break. Examples of the plastic lens base material include styrene resins including (meth)acrylic resins, polycarbonate resins, allyl resins, allyl carbonate resins such as a diethylene glycol bisallyl carbonate resin (CR-39), vinyl resins, polyester resins, polyether resins, urethane resins obtained through reaction of an isocyanate compound with a hydroxy compound such as diethylene glycol, thiourethane resins obtained through reaction of an isocyanate compound with a polythiol compound, as well as cured products (generally referred to as transparent resins) resulting from curing a curable composition that contains a (thio)epoxy compound having one or more disulfide bonds in the molecule. Curable compositions can also be referred to as polymerizable compositions. The lens base material may contain known additives. Examples of additives include ultraviolet absorbers. The amount of ultraviolet rays that strike the eyes of the spectacle wearer when incident from the object-side surface can be reduced in a lens base material containing an ultraviolet absorber.

An untinted material (colorless lens) or a tinted material (colored lens) may be used as the lens base material. Conventional spectacle lenses in which the reflectance to ultraviolet rays on the eyeball-side surface is kept low tended strongly to cause discomfort to the wearer or observer, when containing a colored lens as a lens base material. By contrast, the above spectacle lens can exhibit a favorable appearance even if the lens base material is a colored lens. In a case where the lens base material is a colored lens, the luminous transmittance of the lens base material can be, for example, 20% or more, and can be 30% or more, or 40% or more. Further, the luminous transmittance can be, for example, 80% or less, or 70% or less. The term "luminous transmittance" is a value measured according to JIS T 7333:2005.

The refractive index of the lens base material can be, for example, about 1.60 to 1.75. However, the refractive index of the lens base material is not limited to the above range, and may lie within the above range, or be offset from the above range to higher or lower values. In the present disclosure and the present description, the term refractive index denotes refractive index towards light having a wavelength of 500 nm. The lens base material may be a lens having refractive power (so-called prescription lens) or a lens without refractive power (so-called non-prescription lens).

The spectacle lens can be of various lens types, for example, a single-focus lens, a multi-focus lens or a progressive lens. The type of lens is ordinarily determined by the surface shapes on both sides of the lens base material. The surface of the lens base material may be a convex surface, a concave surface or a planar surface. In ordinary lens base materials and spectacle lenses, the object-side surface is a convex surface and the eyeball-side surface is a concave surface. The present disclosure is, however, not limited thereto.

<Multilayer Film>

The spectacle lens has a multilayer film at least on the eyeball-side surface of the lens base material. The multilayer film may or may not be positioned on the object-side surface of the lens base material.

In a case where the multilayer film is positioned on the object-side surface of the lens base material, the multilayer film positioned on the object-side surface of the lens base material may or may not impart, to the object-side surface of the spectacle lens, physical properties similar to one or more physical properties of the eyeball-side surface of the spectacle lens. In one aspect, the spectacle lens can have a multilayer film on the object-side surface of the lens base material, and the chroma C* measured on the object-side surface of the spectacle lens under a CIE standard illuminant D65 can be 0.5 or more but 5.0 or less. From the viewpoint of making the appearance of the spectacle lens yet better, the chroma C* can be 0.5 or more but 5.0 or less also on the object-side surface of the spectacle lens.

In one aspect, the spectacle lens can have a multilayer film on the object-side surface of the lens base material, and can have one or more of the following physical properties. Specifically, Rm (280-380) measured on the object-side surface of the spectacle lens can be 10.0% or less. Further, Rmax (450-700) measured on the object-side surface of the spectacle lens can be 3.0% or less. Further, Rmin (450-700) measured on the object-side surface of the spectacle lens can be 0.5% or more. Further, Rm (450-700) measured on the object-side surface of the spectacle lens can be 1.0% or more but 1.5% or less. In one aspect, the earlier disclosure above concerning the eyeball-side surface can be referred to concerning the numerical value ranges relating to various physical properties that can be imparted to the object-side surface of the spectacle lens.

The multilayer film may be directly positioned on the surface of the lens base material, or may be indirectly positioned on the surface of the lens base material via one or more other layers. Examples of layers that can be formed between the lens base material and the multilayer film include a polarizing layer, a photochromic layer, and a hard coat layer. The durability (strength) of the spectacle lens can be increased by providing a hard coat layer. The hard coat layer can be, for example, a cured layer obtained through curing of a curable composition. For example, paragraphs [0025] to [0028] and [0030] of Japanese Patent Application Publication No. 2012-128135 can be referred to concerning details on the hard coat layer. A primer layer for improving adhesion may be formed between the lens base material and the multilayer film. For example, paragraphs [0029] and [0030] of Japanese Patent Application Publication No. 2012-128135 can be referred to for details on the primer layer.

A known film formation method can be used as the method for forming the multilayer film. Film formation can be accomplished through vapor deposition, from the viewpoint of ease of film formation. That is, each layer in the multilayer film can be a vapor-deposition film. The term vapor-deposition film denotes a film formed by vapor deposition. In the present disclosure and the present description, the term "vapor deposition" encompasses dry methods, for example, vacuum deposition, ion plating and sputtering. In a vacuum deposition method, an ion beam assist method may be utilized in which an ion beam is simultaneously projected during vapor deposition.

The multilayer film can have a layered structure in which a high refractive index layer and a low refractive index layer are alternately laminated on each other. In the present disclosure and the present description, the terms "high" and "low" pertaining to "high refractive index" and "low refractive index" are relative notations. Specifically, the term high refractive index layer signifies a layer having a higher refractive index than a low refractive index layer included in a same multilayer film. In other words, the term low refractive index layer signifies a layer having a lower refractive index than a high refractive index layer included in a same multilayer film. The refractive index of the high refractive index layer can be, for example, 1.60 or higher (for example, in the range of 1.60 to 2.40), while the refractive index of the low refractive index layer can be, for example, 1.59 or lower (for example in the range of 1.37 to 1.59). As pointed out above, however, the terms "high" and "low" pertaining to a high refractive index a low refractive index are relative, and accordingly the refractive indexes or the high refractive index material and of the low refractive index material are not limited to the above ranges. The multilayer film may include three or more layers having dissimilar refractive indexes.

An inorganic material, an organic material or an organic/inorganic composite material, or an inorganic material, for example, from the viewpoint of film formability, can be used herein as the high refractive index material that makes up the high refractive index layer and as the low refractive index material that makes up the low refractive index layer. That is, the multilayer film can be an inorganic multilayer film. Specific examples of high refractive index materials for forming the high refractive index layer include, for example, one type, or a mixture of two or more types, of oxides selected from the group consisting of zirconium oxide (for example, $ZrO_2$), tantalum oxide ($Ta_2O_5$), titanium oxide (for example $TiO_2$), aluminum oxide ($Al_2O_3$) yttrium oxide (for example $Y_2O_3$), hafnium oxide (for example, $HfO_2$) and niobium oxide (for example, $Nb_2O_5$). Examples of low refractive index materials for forming the low refractive index layer include, for example, one type, or a mixture of two or more types, of oxides or fluorides selected from the group consisting of silicon oxide (for example, $SiO_2$), magnesium fluoride (for example, $MgF_2$) and barium fluoride (for example, $BaF_2$). The oxides and fluorides illustrated above are notated as stoichiometric compositions for the sake of convenience, but also oxides and fluorides with a deficit or excess of oxygen or fluorine relative to the stoichiometric composition can likewise be used as the high refractive index material or low refractive index material.

The high refractive index layer can be a film having a high refractive index material as a main component, and the low refractive index layer is a film having a low refractive index material as a main component. Herein, the term main component denotes a component that takes up most of the film, ordinarily about 50 mass % to 100 mass %, and further about 90 mass % to 100 mass %, relative to the mass of the film. Such a film (for example, a vapor-deposition film) can be formed by forming a film using a film formation material (for example, a vapor deposition source) having the above high refractive index material or low refractive index material as a main component. The same is true of the main component of the film formation material. The film and film formation material may contain impurities that become inevitably mixed in, and may contain other components in amounts that do not impair the function of the main components, for example, other inorganic substances or known additional components that play a role in assisting film formation. Film formation can be accomplished in accordance with a known film formation method, for example, by vapor deposition, from the viewpoint of ease of film formation.

The multilayer film can be, for example, a multilayer film in which the high refractive index layer and the low refractive index layer are alternately laminated in a total of 3 to 10 layers. The film thickness of the high refractive index layer and the film thickness of the low refractive index layer can be established in accordance with the layer configuration. Specifically, the combination of layers included in the multilayer film and the thickness of each layer can be determined by optical simulation in accordance with a known method, on the basis of the refractive indexes of the film formation materials for forming the high refractive index layer and the low refractive index layer, and on the basis of various physical properties to be imparted to the spectacle lens by providing the multilayer film.

Examples of layer configurations of multilayer films include the following, from the side of the lens base material to the side of the lens outermost surface:

a configuration of sequentially laminating a first layer (low refractive index layer)/a second layer (high refractive index layer)/a third layer (low refractive index layer)/a fourth layer (high refractive index layer)/a fifth layer (low refractive index layer)/a sixth layer (high refractive index layer)/a seventh layer (low refractive index layer); and a configuration of sequentially laminating a first layer (low refractive index layer)/a second layer (high refractive index layer)/a third layer (low refractive index layer)/a fourth layer (high refractive index layer)/a fifth layer (low refractive index layer)/a sixth layer (high refractive index layer)/a seventh layer (low refractive index layer)/an eighth layer (high refractive index layer)/a ninth layer (low refractive index layer).

Further examples include a configuration wherein the first layer is a high refractive index layer, and a configuration including three types of layer having dissimilar refractive indexes (a high refractive index layer, a low refractive index layer, and a layer (medium refractive index layer) having a refractive index lower than that of the high refractive index layer and higher than that of the low refractive index layer). In the above examples of layer configurations, the notation "/" is used encompassing instances where the layer set out on the left and the layer set out on the right of the "/" are directly in contact with each other, and also instances where a below-described conductive oxide layer is present between the layer set out on the left and the layer set out on the right of the "/".

Examples of a combination of the low refractive index layer and the high refractive index layer included in the multilayer film include a combination of a layer having silicon oxide as a main component (silicon oxide layer; low refractive index layer) and a layer having zirconium oxide as a main component (zirconium oxide layer; high refractive index layer). A further example is a combination of a layer having silicon oxide as a main component (silicon oxide layer; low refractive index layer) and a layer having niobium oxide as a main component (niobium oxide layer; high refractive index layer). A further example is a combination of a layer having silicon oxide as a main component (silicon oxide layer; low refractive index layer) and a layer having tantalum oxide as a main component (tantalum oxide layer; high refractive index layer). A further example is a combination of a layer having silicon oxide as a main component (silicon oxide layer; low refractive index layer) and a layer having titanium oxide as a main component (titanium oxide layer; high refractive index layer). Other examples of the multilayer film include a multilayer film that has at least one layered structure in which two layers of the above combinations are directly in contact with each other, or a layered structure in which a below-described conductive oxide layer is present between two layers of the above combinations. Examples of the multilayer film include multilayer films having a combination of the above low refractive index layer and high refractive index layer, and including an aluminum oxide layer as a medium refractive index layer.

The film thickness of each of the high refractive index layers and low refractive index layers included in the multilayer film can be, for example, 3 to 500 nm, and the total thickness of the multilayer film can be, for example, 100 to 900 nm.

In addition to the high refractive index layer and low refractive index layer explained above, the multilayer film can include, at an arbitrary position thereof, a layer (conductive oxide layer) having a conductive oxide as a main component, for example, one or more vapor-deposition films of a conductive oxide formed by vapor deposition in which there is used a vapor deposition source having a conductive oxide as a main component. The same applies to the main components described concerning the conductive oxide layers.

The conductive oxide layer can be an indium tin oxide (tin-doped indium oxide; ITO) layer having a film thickness of 10 nm or less, a tin oxide layer having a film thickness of 10 nm or less, or a titanium oxide layer having a film thickness of 10 nm or less, from the viewpoint of transparency of the spectacle lens. The indium tin oxide (ITO) layer is a layer containing ITO as a main component. The same applies to a tin oxide layer and to a titanium oxide layer. Adhesion of dust or dirt due to electrical charging of the spectacle lens can be prevented by virtue of the fact that the multilayer film contains a conductive oxide layer. In the present disclosure and the present description, an indium tin oxide (ITO) layer having a film thickness of 10 nm or less, a tin oxide layer having a film thickness of 10 nm or less and a titanium oxide layer having a film thickness of 10 nm or less are not considered as the "high refractive index layer"

and a "low refractive index layer" included in the multilayer film. That is, even in a case where one or more of the foregoing layers is included in the multilayer film, these layers are not regarded as a "high refractive index layer" or a "low refractive index layer". The film thickness of the above conductive oxide layer having a film thickness of 10 nm or less can be, for example 0.1 nm or more.

A further functional film can be formed on the multilayer film. Examples of such a functional film include various functional films such as a water-repellent or hydrophilic antifouling films, antifogging films and the like. Known techniques can be applied to in all of these functional films.

<Physical Properties of Spectacle Lenses>

The luminous reflectance Rv of the spectacle lens can be low, from the viewpoint of improving the appearance quality of the spectacle lens. In one aspect, the luminous reflectance Rv measured on the eyeball-side surface of the spectacle lens can be 1.5% or less, and can be 1.4% or less, or 1.3% or less. In one aspect, the luminous reflectance Rv measured on the eyeball-side surface of the spectacle lens can be 0.5% or more. In one aspect, the luminous reflectance Rv measured on the object-side surface of the spectacle lens can be 1.5% or less, and can be 1.4% or less, or 1.3% or less. In one aspect, the luminous reflectance Rv measured on the object-side surface of the spectacle lens can be 0.5% or more. The luminous reflectance Rv can be adjusted, for example, on the basis of on the layer configuration of the multilayer film that is provided in the spectacle lens, and can be established, for example, on the basis of an optical simulation in accordance with a known method.

[Spectacles]

A further aspect of the present disclosure relates to spectacles that are provided with the above spectacle lens according to one aspect of the present disclosure. Detailed particulars concerning the spectacle lens included in the spectacles are as described above. A favorable appearance can be exhibited, and a favorable wearing feeling can be imparted to the spectacle wearer, by the fact that the above spectacle lens is provided. No particular restrictions apply to the configuration of the spectacles, for example, in terms of frames and so forth, and known techniques can be adopted herein.

EXAMPLES

The present disclosure will be further explained hereafter by way of Examples. However, the present disclosure is not limited to the implementations illustrated in Examples.

In Examples and Comparative Examples, the multilayer vapor-deposition film was formed through sequentially laminating a first layer, a second layer . . . sequentially using vapor deposition sources given in the table below, in the order from the top of the table down, from the lens base material side (hard coat side) towards the spectacle lens surface, both on the eyeball-side and on the object side, so that the outermost layer on the spectacle lens front surface side constituted the layer formed out of the vapor deposition source given in the bottom row of the tables below. In Examples and Comparative Examples, respective layers having the film thickness given in the tables were formed sequentially through the use of a respective vapor deposition source consisting of the respective oxide given in the tables, except for impurities that might be inevitably mixed into the oxide.

Example 1

On a hard coat surface of a plastic lens base material (colorless lens; refractive index 1.67) having a convex object-side surface and a concave eyeball-side surface, with both sides of the lens base material having been optically finished and having had a hard coat applied thereto beforehand, a multilayer vapor-deposition film having the layer configuration given in the table below was formed, on the concave side (eyeball-side), by ion-assisted vapor deposition using oxygen gas and nitrogen gas as assist gases.

A multilayer vapor-deposition film having the layer configuration given in the table was formed by ion-assisted vapor deposition, under the same conditions, on a hard coat surface on the convex side (object-side).

The spectacle lens of Example 1 was obtained as a result.

TABLE 1

| Example 1 (concave side and convex side) | | | | | |
|---|---|---|---|---|---|
| | | | Ion gun conditions | Assist gas introduction amount | |
| | Vapor deposition source | Film thickness (nm) | Current (mA) | Voltage (V) | $O_2$ (cc) | $N_2$ (cc) |
| 1st layer | $SiO_2$ | 35 | 210 | 420 | 10 | 10 |
| 2nd layer | $ZrO_2$ | 8 | 230 | 470 | 10 | 10 |
| 3rd layer | $SiO_2$ | 400 | 210 | 420 | 10 | 10 |
| 4th layer | $ZrO_2$ | 19 | 230 | 470 | 10 | 10 |
| 5th layer | $SiO_2$ | 18 | 210 | 420 | 10 | 10 |
| 6th layer | $ZrO_2$ | 105 | 230 | 470 | 10 | 10 |
| 7th layer | $SiO_2$ | 70 | 210 | 420 | 10 | 10 |

Example 2

A spectacle lens of Example 2 was obtained in accordance with the same of method as in Example 1, but herein respective multilayer vapor-deposition films having the layer configurations given in the table below were formed by ion-assisted vapor deposition, under the conditions given in the table below, on the hard coat surfaces on the concave side and on the convex side.

TABLE 2

| Example 1 (concave side and convex side) | | | | | |
|---|---|---|---|---|---|
| | | | Ion gun conditions | Assist gas introduction amount | |
| | Vapor deposition source | Film thickness (nm) | Current (mA) | Voltage (V) | $O_2$ (cc) | $N_2$ (cc) |
| 1st layer | $SiO_2$ | 35 | 210 | 420 | 10 | 10 |
| 2nd layer | $ZrO_2$ | 8 | 230 | 470 | 10 | 10 |
| 3rd layer | $SiO_2$ | 400 | 210 | 420 | 10 | 10 |
| 4th layer | $ZrO_2$ | 19 | 230 | 470 | 10 | 10 |
| 5th layer | $SiO_2$ | 21 | 210 | 420 | 10 | 10 |
| 6th layer | $ZrO_2$ | 105 | 230 | 470 | 10 | 10 |
| 7th layer | $SiO_2$ | 71 | 210 | 420 | 10 | 10 |

Example 3

A spectacle lens of Example 3 was obtained in accordance with the same of method as in Example 1, but herein respective multilayer vapor-deposition films having the layer configurations given in the table below were formed by ion-assisted vapor deposition, under the conditions given in the table below, on the hard coat surfaces on the concave side and on the convex side.

TABLE 3

Table 1: Example 3 (concave side and convex side)

| | Vapor deposition source | Film thickness (nm) | Ion gun conditions | | Assist gas introduction amount | |
|---|---|---|---|---|---|---|
| | | | Current (mA) | Voltage (V) | $O_2$ (cc) | $N_2$ (cc) |
| 1st layer | $SiO_2$ | 36 | 210 | 420 | 10 | 10 |
| 2nd layer | $ZrO_2$ | 8 | 230 | 470 | 10 | 10 |
| 3rd layer | $SiO_2$ | 382 | 210 | 420 | 10 | 10 |
| 4th layer | $ZrO_2$ | 18 | 230 | 470 | 10 | 10 |
| 5th layer | $SiO_2$ | 17 | 210 | 420 | 10 | 10 |
| 6th layer | $ZrO_2$ | 102 | 230 | 470 | 10 | 10 |
| 7th layer | $SiO_2$ | 67 | 210 | 420 | 10 | 10 |

Example 4

A spectacle lens of Example 4 was obtained in accordance with the same of method as in Example 1, but herein respective multilayer vapor-deposition films having the layer configurations given in the table below were formed by ion-assisted vapor deposition, under the conditions given in the table below, on the hard coat surfaces on the concave side and on the convex side.

TABLE 4

Example 4 (concave side and convex side)

| | Vapor deposition source | Film thickness (nm) | Ion gun conditions | | Assist gas introduction amount | |
|---|---|---|---|---|---|---|
| | | | Current (mA) | Voltage (V) | $O_2$ (cc) | $N_2$ (cc) |
| 1st layer | $SiO_2$ | 35 | 210 | 420 | 10 | 10 |
| 2nd layer | $Ta_2O_5$ | 5 | 230 | 470 | 10 | 10 |
| 3rd layer | $SiO_2$ | 400 | 210 | 420 | 10 | 10 |
| 4th layer | $Ta_2O_5$ | 17 | 230 | 470 | 10 | 10 |
| 5th layer | $SiO_2$ | 20 | 210 | 420 | 10 | 10 |
| 6th layer | $Ta_2O_5$ | 97 | 230 | 470 | 10 | 10 |
| 7th layer | $SiO_2$ | 72 | 210 | 420 | 10 | 10 |

Example 5

A spectacle lens of Example 5 was obtained in accordance with the same of method as in Example 1, but herein a multilayer vapor-deposition film having the layer configuration given in the table below was formed by ion-assisted vapor deposition, under the conditions given in the table below, on a hard coat surface on the convex side (object side).

TABLE 5

Example 5 (convex side)

| | Vapor deposition source | Film thickness (nm) | Ion gun conditions | | Assist gas introduction amount | |
|---|---|---|---|---|---|---|
| | | | Current (mA) | Voltage (V) | $O_2$ (cc) | $N_2$ (cc) |
| 1st layer | $SiO_2$ | 37 | 210 | 420 | 10 | 10 |
| 2nd layer | $ZrO_2$ | 8 | 230 | 470 | 10 | 10 |
| 3rd layer | $SiO_2$ | 425 | 210 | 420 | 10 | 10 |

TABLE 5-continued

Example 5 (convex side)

| | Vapor deposition source | Film thickness (nm) | Ion gun conditions | | Assist gas introduction amount | |
|---|---|---|---|---|---|---|
| | | | Current (mA) | Voltage (V) | $O_2$ (cc) | $N_2$ (cc) |
| 4th layer | $ZrO_2$ | 22 | 230 | 470 | 10 | 10 |
| 5th layer | $SiO_2$ | 46 | 210 | 420 | 10 | 10 |
| 6th layer | $ZrO_2$ | 32 | 230 | 470 | 10 | 10 |
| 7th layer | $SiO_2$ | 100 | 210 | 420 | 10 | 10 |

Example 6

A spectacle lens of Example 6 was obtained in accordance with the same of method as in Example 1, but herein respective multilayer vapor-deposition films having the layer configurations given in the table below were formed by ion-assisted vapor deposition, under the conditions given in the table below, on the hard coat surfaces on the concave side and on the convex side.

TABLE 6

Example 6 (concave side and convex side)

| | Vapor deposition source | Film thickness (nm) | Ion gun conditions | | Assist gas introduction amount | |
|---|---|---|---|---|---|---|
| | | | Current (mA) | Voltage (V) | $O_2$ (cc) | $N_2$ (cc) |
| 1st layer | $SiO_2$ | 15 | 210 | 420 | 10 | 10 |
| 2nd layer | $ZrO_2$ | 3 | 230 | 470 | 10 | 10 |
| 3rd layer | $SiO_2$ | 28 | 210 | 420 | 10 | 10 |
| 4th layer | $ZrO_2$ | 8 | 230 | 470 | 10 | 10 |
| 5th layer | $SiO_2$ | 388 | 210 | 420 | 10 | 10 |
| 6th layer | $ZrO_2$ | 20 | 230 | 470 | 10 | 10 |
| 7th layer | $SiO_2$ | 17 | 210 | 420 | 10 | 10 |
| 8th layer | $ZrO_2$ | 105 | 230 | 470 | 10 | 10 |
| 9th layer | $SiO_2$ | 72 | 210 | 420 | 10 | 10 |

Comparative Example 1

A spectacle lens of Comparative Example 1 was obtained in accordance with the same of method as in Example 1, but herein respective multilayer vapor-deposition films having the layer configurations given in the table below were formed by ion-assisted vapor deposition, under the conditions given in the table below, on the hard coat surfaces on the concave side and on the convex side.

TABLE 7

Comparative Example 1 (concave side and convex side)

| | Vapor deposition source | Film thickness (nm) | Ion gun conditions | | Assist gas introduction amount | |
|---|---|---|---|---|---|---|
| | | | Current (mA) | Voltage (V) | $O_2$ (cc) | $N_2$ (cc) |
| 1st layer | $SiO_2$ | 36 | 210 | 420 | 10 | 10 |
| 2nd layer | $ZrO_2$ | 8 | 230 | 470 | 10 | 10 |
| 3rd layer | $SiO_2$ | 382 | 210 | 420 | 10 | 10 |
| 4th layer | $ZrO_2$ | 18 | 230 | 470 | 10 | 10 |

TABLE 7-continued

Comparative Example 1 (concave side and convex side)

| | Vapor deposition source | Film thickness (nm) | Ion gun conditions | | Assist gas introduction amount | |
|---|---|---|---|---|---|---|
| | | | Current (mA) | Voltage (V) | O₂ (cc) | N₂ (cc) |
| 5th layer | SiO₂ | 16 | 210 | 420 | 10 | 10 |
| 6th layer | ZrO₂ | 102 | 230 | 470 | 10 | 10 |
| 7th layer | SiO₂ | 67 | 210 | 420 | 10 | 10 |

Comparative Example 2

A spectacle lens of Comparative Example 2 was obtained in accordance with the same of method as in Example 1, but herein respective multilayer vapor-deposition films having the layer configurations given in the table below were formed by ion-assisted vapor deposition, under the conditions given in the table below on the hard coat surfaces on the concave side and on the convex side.

TABLE 8

Comparative Example 2 (concave side and convex side)

| | Vapor deposition source | Film thickness (nm) | Ion gun conditions | | Assist gas introduction amount | |
|---|---|---|---|---|---|---|
| | | | Current (mA) | Voltage (V) | O₂ (cc) | N₂ (cc) |
| 1st layer | SiO₂ | 21 | 210 | 420 | 10 | 10 |
| 2nd layer | ZrO₂ | 3 | 230 | 470 | 10 | 10 |
| 3rd layer | SiO₂ | 416 | 210 | 420 | 10 | 10 |
| 4th layer | ZrO₂ | 14 | 230 | 470 | 10 | 10 |
| 5th layer | SiO₂ | 22 | 210 | 420 | 10 | 10 |
| 6th layer | ZrO₂ | 110 | 230 | 470 | 10 | 10 |
| 7th layer | SiO₂ | 80 | 210 | 420 | 10 | 10 |

[Methods for Measuring Various Physical Properties]
<1. Reflection Spectral Property>

A direct-incidence reflection spectral property at the optical center was measured for the eyeball-side surface and the object-side surface of each spectacle lens of Examples and Comparative Examples.

The above measurement was performed using a lens reflectance measuring instrument USPM-RU by Olympus Corporation (measurement pitch: 1 nm). FIG. 1 to FIG. 8 illustrate reflection spectra obtained for the respective spectacle lenses of Examples and Comparative Examples.

Figure 1:
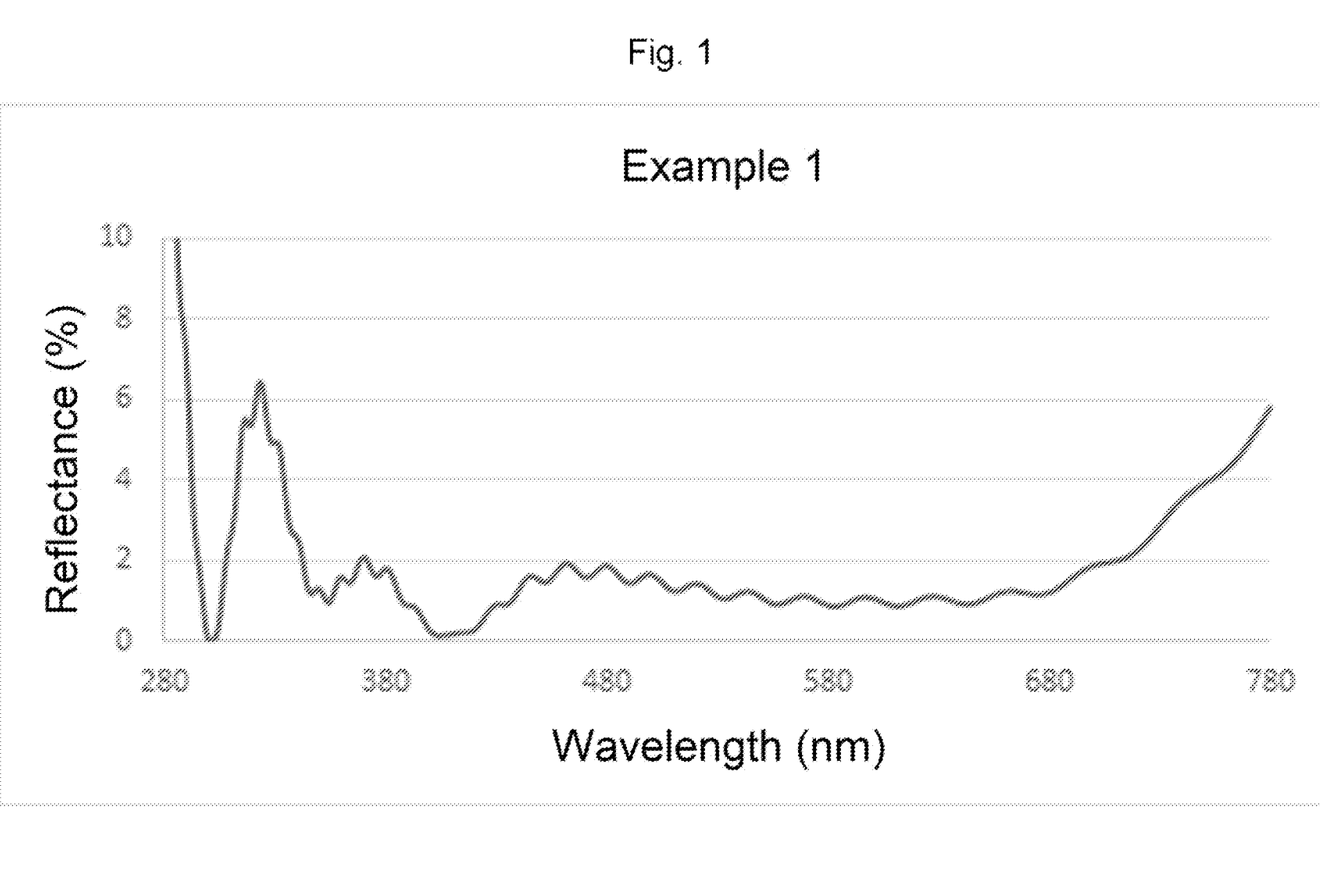
FIG. 1 is a reflection spectrum obtained through measurement on an eyeball-side surface of a spectacle lens of Example 1.
Figure 2:
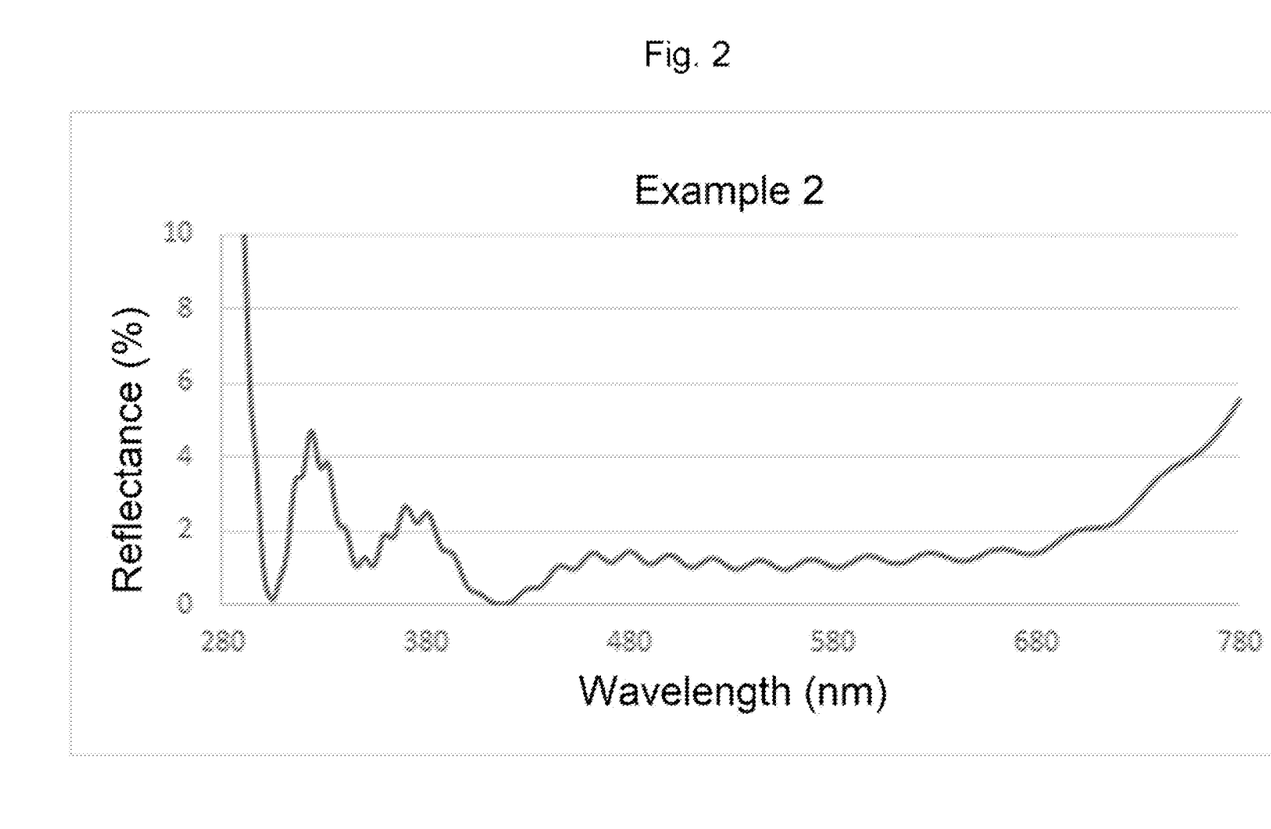
FIG. 2 is a reflection spectrum obtained through measurement on an eyeball-side surface of a spectacle lens of Example 2.
Figure 3:
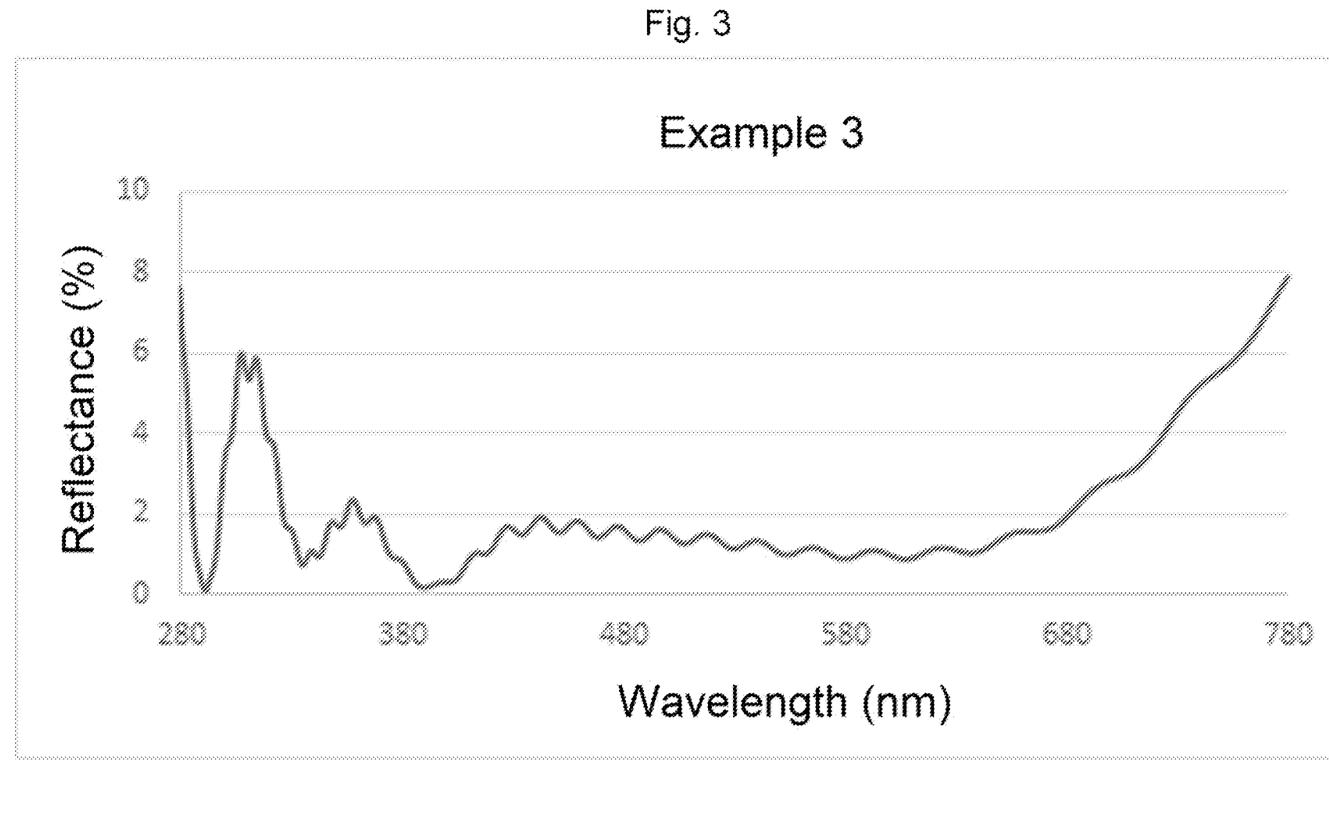
FIG. 3 is a reflection spectrum obtained through measurement on an eyeball-side surface of a spectacle lens of Example 3.
Figure 4:
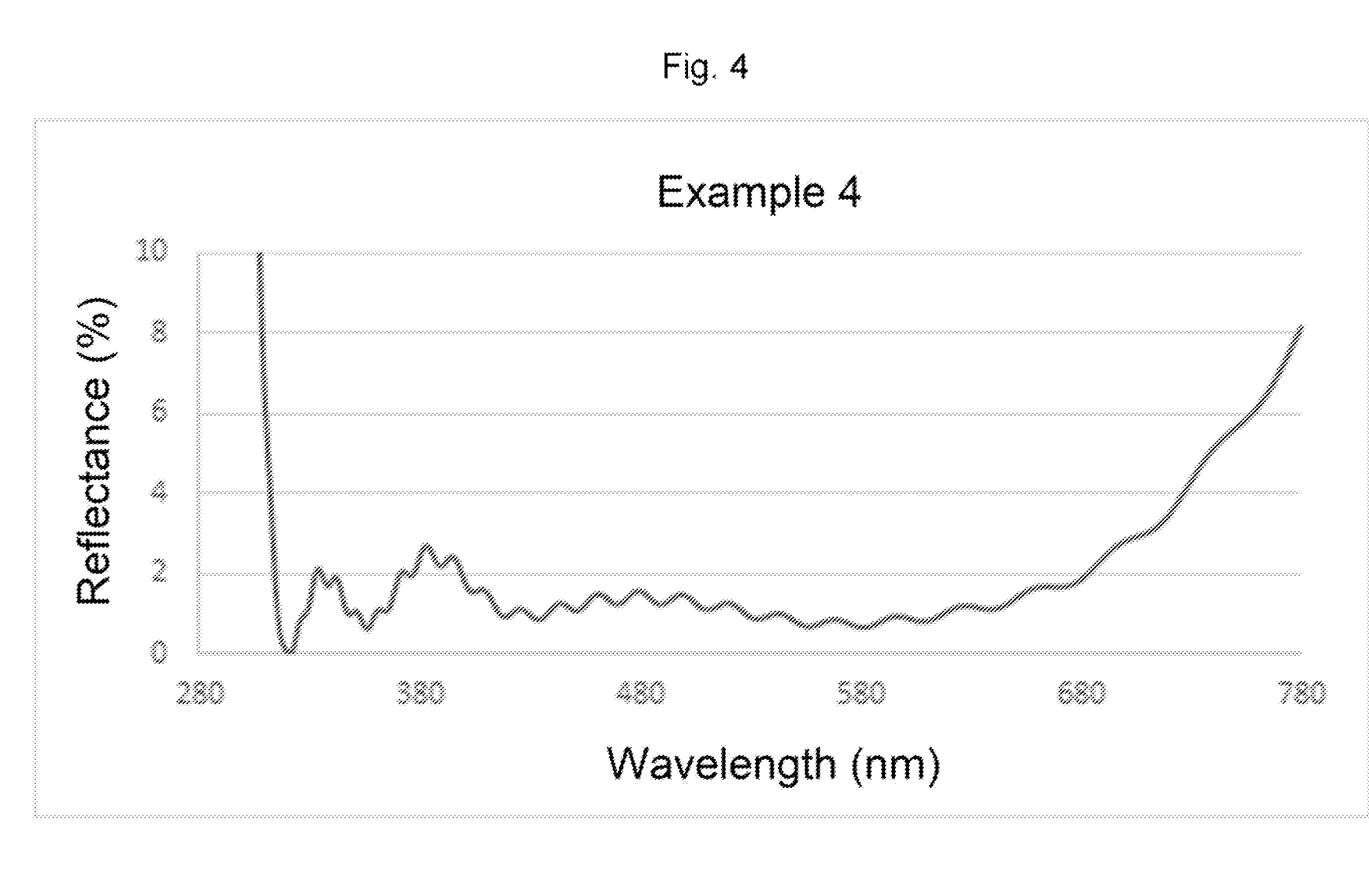
FIG. 4 is a reflection spectrum obtained through measurement on an eyeball-side surface of a spectacle lens of Example 4.
Figure 5:
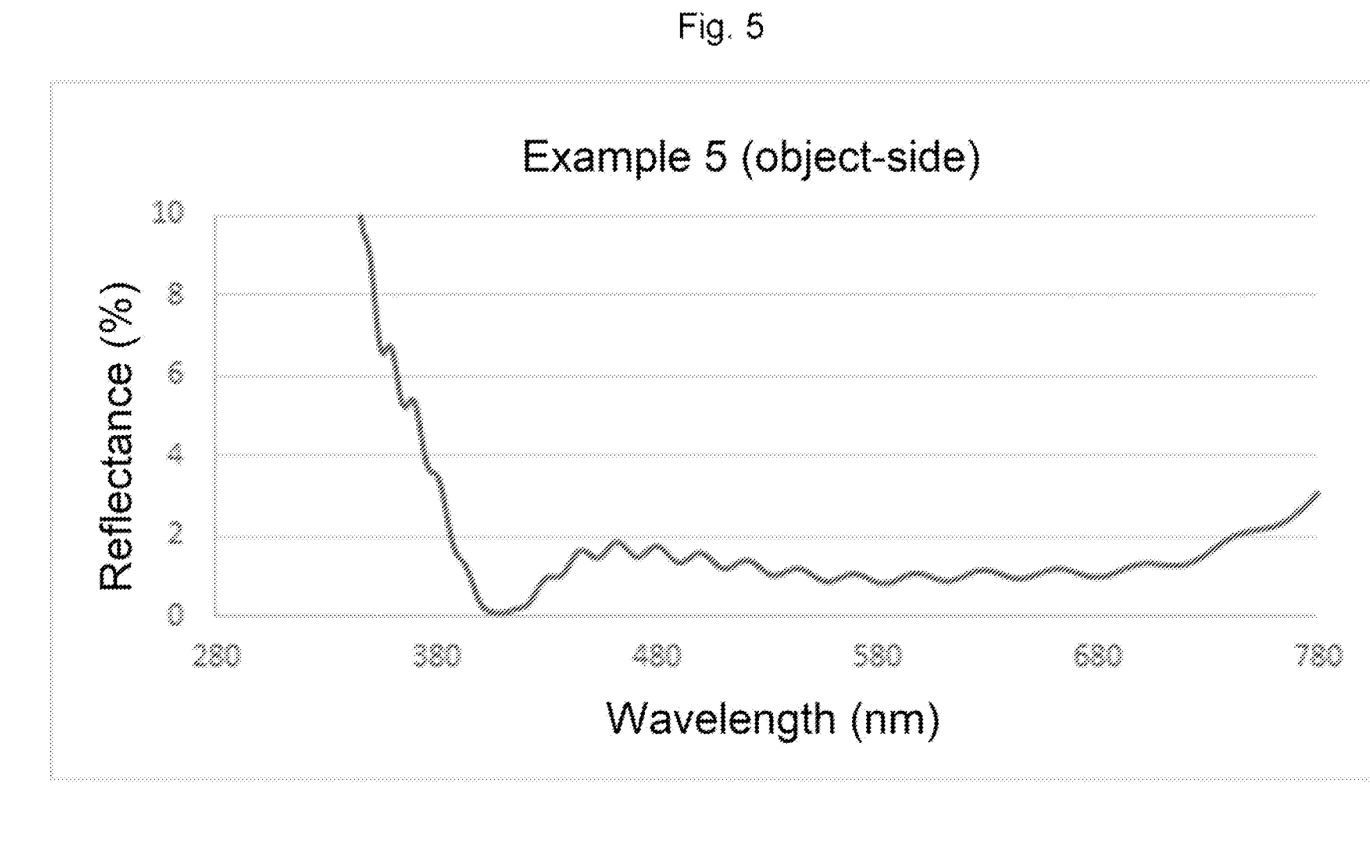
FIG. 5 is a reflection spectrum obtained through measurement on an object-side surface of a spectacle lens of Example 5.
Figure 6:
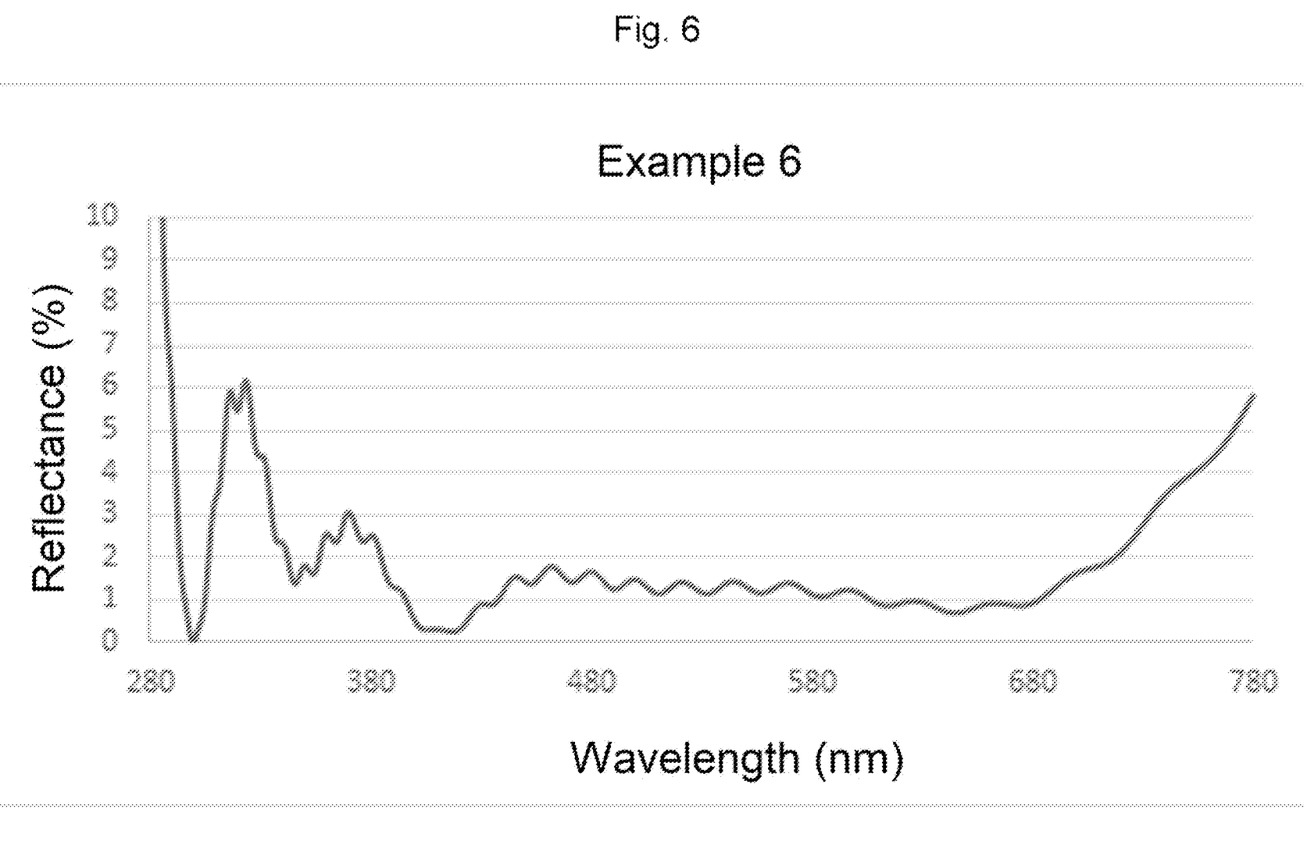
FIG. 6 is a reflection spectrum obtained through measurement on an eyeball-side surface of a spectacle lens of Example 6.
Figure 7:
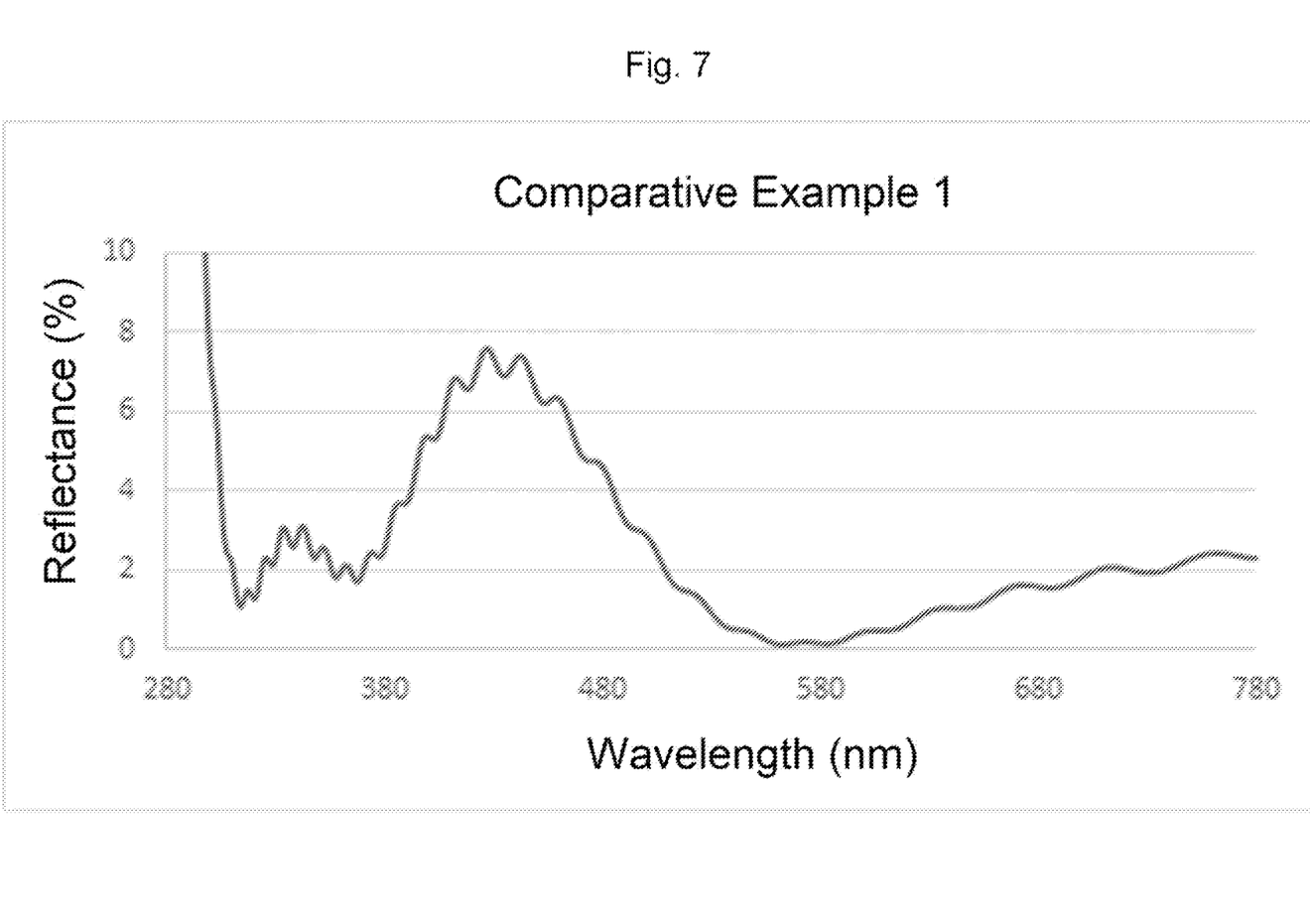
FIG. 7 is a reflection spectrum obtained through measurement on an eyeball-side surface of a spectacle lens of Comparative Example 1.
Figure 8:
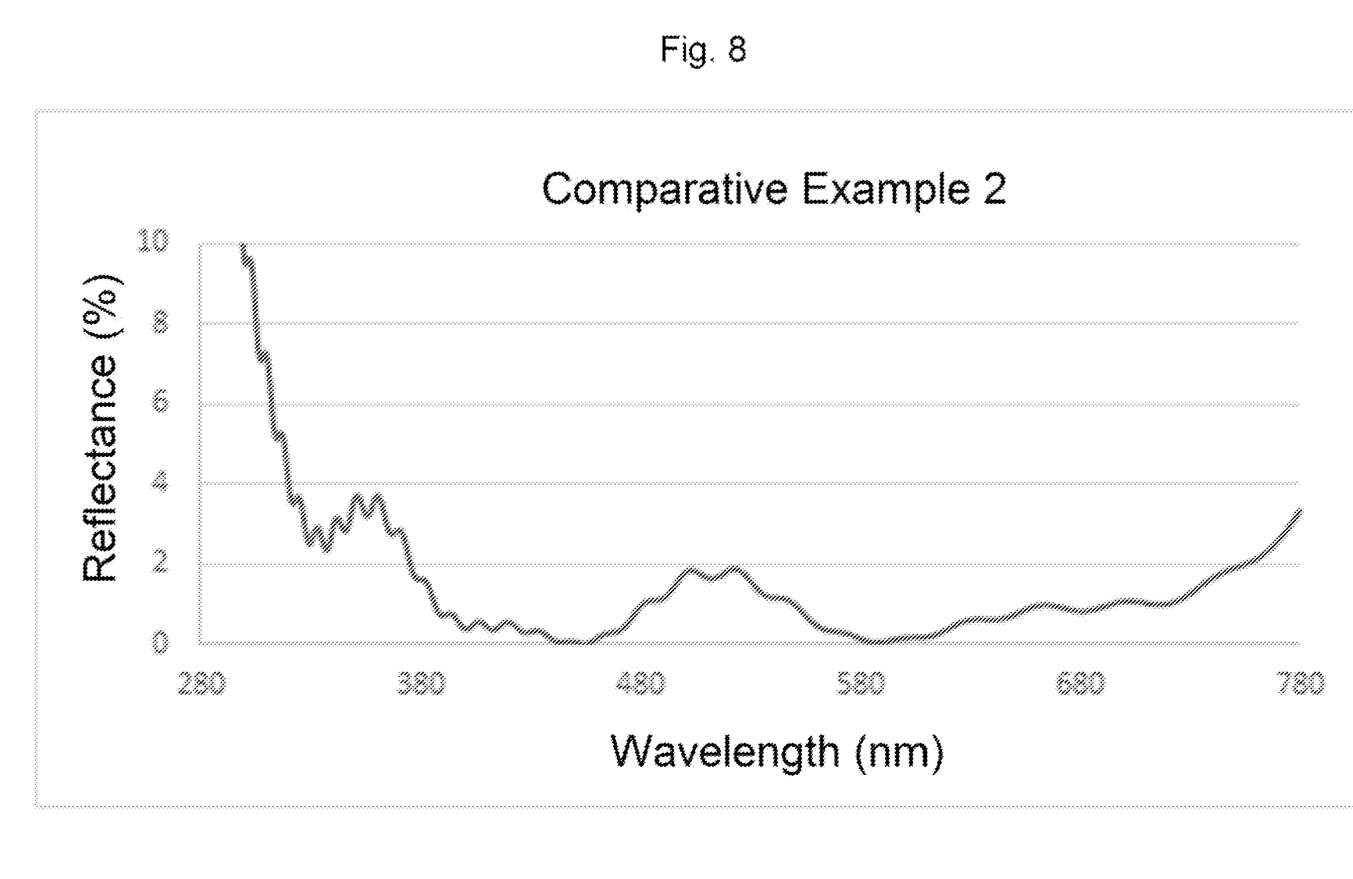
FIG. 8 is a reflection spectrum obtained through measurement on an eyeball-side surface of a spectacle lens of Comparative Example 2.

FIG. 1 is a reflection spectrum obtained through measurement on the eyeball-side surface of the spectacle lens of Example 1.
FIG. 2 is a reflection spectrum obtained through measurement on the eyeball-side surface of the spectacle lens of Example 2.
FIG. 3 is a reflection spectrum obtained through measurement on the eyeball-side surface of the spectacle lens of Example 3.
FIG. 4 is a reflection spectrum obtained through measurement on the eyeball-side surface of the spectacle lens of Example 4.
FIG. 5 is a reflection spectrum obtained through measurement on the object-side surface of a spectacle lens of Example 5.
FIG. 6 is a reflection spectrum obtained through measurement on the eyeball-side surface of the spectacle lens of Example 6.
FIG. 7 is a reflection spectrum obtained through measurement on the eyeball-side surface of the spectacle lens of Comparative example 1.
FIG. 8 is a reflection spectrum obtained through measurement on the eyeball-side surface of the spectacle lens of Comparative example 2.

The various reflectances given in the table below were worked out on the basis of the above measured direct-incidence reflection spectral property.

<2. Chroma C* and Hue Angle h>

The chroma C* and hue angle h of each spectacle lens of Examples and Comparative Examples were measured under a CIE standard illuminant D65.

<3. Luminous Reflectance>

The luminous reflectance Rv of each spectacle lens in Examples and Comparative Examples was worked out in accordance with JIS T 7334:2011, using the measurement results of the direct-incidence reflection spectral property obtained in 1. above.

The spectacle lenses of Examples 1 to 4 and 6 and Comparative Examples 1 and 2 have multilayer vapor-deposition films of identical layer configuration on both sides, and accordingly the various physical properties measured on the object-side surface are the same as the physical properties measured on the eyeball-side surface.

The spectacle lens of Example 5 has the same multilayer vapor-deposition film as that of Example 1 on the eyeball-side surface, and accordingly the various physical properties measured on the eyeball-side surface are the same as the physical properties measured on the eyeball-side surface in Example 1.

The results of the above measurements are set out in the table below.

TABLE 9

Measurement results of physical properties of Examples and Comparative Examples

| | Ex. 1 | Ex. 2 | Ex. 3 | Ex. 4 | Ex. 5 | | Ex. 6 | Comp. Ex. 1 | Comp. Ex. 2 |
|---|---|---|---|---|---|---|---|---|---|
| Lens surface | Object-side, eyeball-side | Object-side, eyeball-side | Object-side, eyeball-side | Object-side, eyeball-side | Object-side | Eyeball-side | Object-side, eyeball-side | Object-side, eyeball-side | Object-side, eyeball-side |
| Luminous reflectance Rv | 1.1 | 1.2 | 1.2 | 1.0 | 1.1 | 1.1 | 1.2 | 0.9 | 0.8 |
| Hue angle h | 215.9 | 106.1 | 271.2 | 259.0 | 223.3 | 215.9 | 178.0 | 290.6 | 155.1 |
| Chroma C* | 3.8 | 3.5 | 4.7 | 3.1 | 3.5 | 3.8 | 2.3 | 35.3 | 17.5 |
| Rm (280-380) | 3.5 | 3.8 | 2.5 | 9.3 | 24.6 | 3.5 | 3.8 | 6.2 | 6.5 |

TABLE 9-continued

Measurement results of physical properties of Examples and Comparative Examples

| Lens surface | Ex. 1 Object-side, eyeball-side | Ex. 2 Object-side, eyeball-side | Ex. 3 Object-side, eyeball-side | Ex. 4 Object-side, eyeball-side | Ex. 5 Object-side | Ex. 5 Eyeball-side | Ex. 6 Object-side, eyeball-side | Comp. Ex. 1 Object-side, eyeball-side | Comp. Ex. 2 Object-side, eyeball-side |
|---|---|---|---|---|---|---|---|---|---|
| Rmax (450-700) | 1.9 | 2.0 | 2.9 | 2.8 | 1.9 | 1.9 | 1.8 | 6.5 | 1.9 |
| Rmin (450-700) | 0.9 | 1.0 | 0.9 | 0.7 | 0.8 | 0.9 | 0.7 | 0.1 | 0.0 |
| Rm (450-700) | 1.3 | 1.3 | 1.4 | 1.3 | 1.2 | 1.3 | 1.2 | 1.7 | 0.8 |

Each spectacle lens of Examples 1 to 6 has an average reflectance Rm (280-380) of 10.0% or less in the wavelength region of 280 to 380 nm, measured on the eyeball-side surface. Therefore, the spectacle lenses of Examples 1 to 6 allow reducing the amount of ultraviolet rays that strike the eyes of the wearer through reflection on the eyeball-side surface, and accordingly allow conferring a favorable wearing feeling by reducing the burden on the eyes of the wearer.

When observed from the eyeball-side and the object side, the spectacle lens of Example 1 exhibited a white reflection color on the spectacle lens surface, with virtually no perceivable color tinge.

When observed from the eyeball-side and the object side, the spectacle lens of Example 2 exhibited a yellowish white reflection color.

When observed from the eyeball-side and the object side, the spectacle lens of Example 3 exhibited a bluish white reflection color.

When observed from the eyeball-side and the object side, the spectacle lens of Example 4 exhibited a thin white reflection color.

In the spectacle lens of Example 5, the same multilayer vapor-deposition film as that of Example 1 was provided on the eyeball-side surface, while a multilayer vapor-deposition film of comparatively high reflectance towards ultraviolet rays was provided on the object-side surface. When observed from the eyeball-side and the object side, the spectacle lens of Example 5 exhibited a white reflection color on the spectacle lens surface, with virtually no perceivable color tinge.

When observed from the eyeball-side and the object side, the spectacle lens of Example 6 exhibited a white reflection color on the spectacle lens surface, with virtually no perceivable color tinge.

The spectacle lenses of Examples 1 to 6 had favorable appearance.

When observed from the eyeball-side and the object side, the spectacle lens of Comparative Example 1 exhibited a vivid bluish-purple reflection color.

When observed from the eyeball-side and the object side, the spectacle lens of Comparative Example 2 exhibited a vivid green reflection color.

[Appearance Evaluation Test]

1. Production of Test Lenses

Spectacle lenses were produced in accordance with the same method as in Examples 1 to 3 and Comparative Examples 1 and 2, but using herein the following Samples 1 to 4 as the lens base material.

Sample 1: brown-tinted plastic lens base material, yielding a luminous transmittance of 30%

Sample 2: brown-tinted plastic lens base material, yielding a luminous transmittance of 60%

Sample 3: gray-tinted plastic lens base material, yielding a luminous transmittance of 30%

Sample 4: gray-tinted plastic lens base material, yielding a luminous transmittance of 60%

2. Sensory Test

Figure 9:
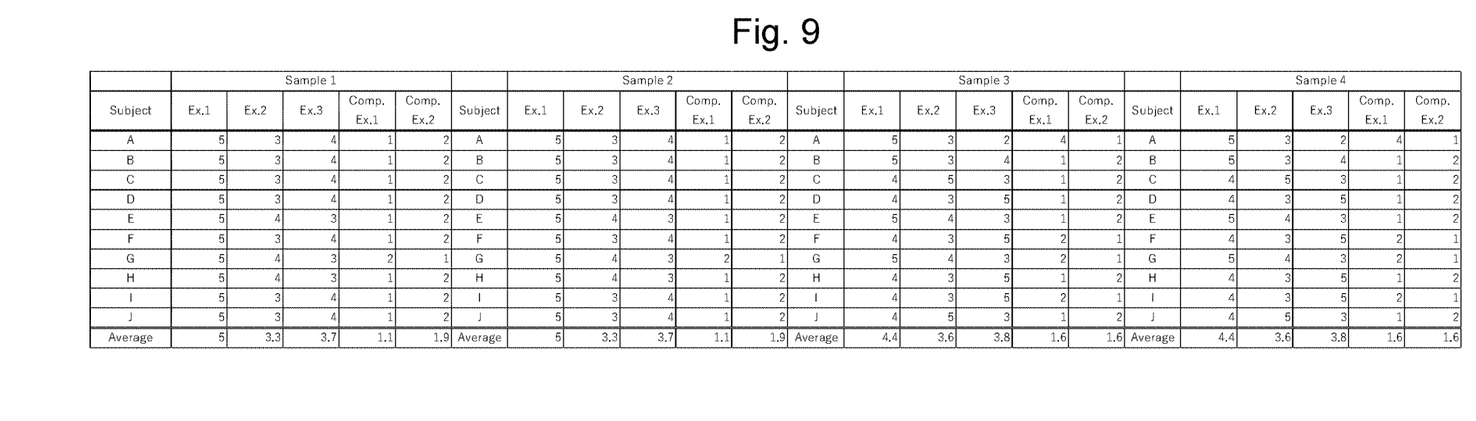
FIG. 9 illustrates results of ranking by 10 subjects in a below-described sensory test.

The appearance of the produced test lenses was assessed by 10 subjects, from the eyeball-side and the object side, and was ranked in descending order of preferable appearance as 1: most preferable (5 points), 2: preferable (4 points), 3: normal (3 points) 4: poor (2 points) and poorest (1 point). FIG. 9 illustrates the results of the rankings by the 10 subjects.

The ranking results illustrated in FIG. 9 reveal that when using all the lens base materials of Samples 1 to 4, test lenses having the same multilayer vapor-deposition film as that of Example 2 exhibited a preferable appearance, as the appearance perceived by the subjects, while test lenses having the same multilayer vapor-deposition film as that of Example 3 exhibited a more preferable appearance, and test lenses having the same multilayer vapor-deposition film as that of Example 1 exhibited a yet more preferable appearance.

The results illustrated in FIG. 9 further reveal that the appearance perceived by the subjects was better in the case of a comparatively large hue angle h, i.e. in the case of a white or bluish-white reflection color.

The ranking results illustrated in FIG. 9 reveal that, when using by contrast all the lens base materials of Samples 1 to 4, test lenses having the same multilayer vapor-deposition film as that of Comparative Example 2 exhibited a poorer appearance, as the appearance perceived by the subjects, and test lenses having the same multilayer vapor-deposition film as that of Comparative Example 1 exhibited yet poorer appearance, as compared with the appearance of the above test samples. It is thus estimated that when a vivid reflection color overlaps the color of the lens base material, the resulting difference in color shades causes discomfort to the wearer and to observers.

The above aspects are lastly summarized as follows.

According to one aspect, a spectacle lens is provided that has at least a lens base material, and a multilayer film positioned on an eyeball-side surface of the lens base material, wherein an average reflectance Rm (280-380) in a wavelength region of 280 to 380 nm, measured on the eyeball-side surface of the spectacle lens, is 10.0% or less, and a chroma C* of the spectacle lens, measured on the eyeball-side surface under a CIE standard illuminant D65, is 0.5 or more but 5.0 or less.

The above spectacle lens can exhibit favorable appearance, and can bestow a favorable wearing feeling to the wearer of spectacles that are provided with that spectacle lens.

In one aspect, a luminous reflectance Rv measured on the eyeball-side surface of the spectacle lens can be 0.5% or more but 1.5% or less.

In one aspect, a maximum reflectance Rmax (450-700) in a wavelength region of 450 to 700 nm, measured on the eyeball-side surface of the spectacle lens, can be 3.0% or less.

In one aspect, a minimum reflectance Rmin (450-700) in a wavelength region of 450 to 700 nm, measured on the eyeball-side surface of the spectacle lens, can be 0.5% or more.

In one aspect, an average reflectance Rm (450-700) in a wavelength region of 450 to 700 nm, measured on the eyeball-side surface of the spectacle lens, can be 1.0% or more but 1.5% or less.

A further aspect of the present disclosure relates to spectacles that are provided with the above spectacle lens.

Two or more of the various aspects set forth in the present description can be combined in arbitrary combinations.

It should be noted that the embodiments disclosed herein are exemplary in all respects, and are not limiting in any way. The scope of the present disclosure is defined by the claims, not by the above explanation, and is meant to encompass all modifications within a meaning and scope equivalent to those of the claims.

One aspect of the present disclosure is useful in the field of manufacturing of spectacle lenses and spectacles.

What is claimed is:

1. A spectacle lens comprising at least a lens base material, and a multilayer film positioned on an eyeball-side surface of the lens base material,
   wherein an average reflectance Rm (280-380) in a wavelength region of 280 to 380 nm, measured on the eyeball-side surface of the spectacle lens, is 10.0% or less,
   a chroma C*, measured on the eyeball-side surface of the spectacle lens under a CIE standard illuminant D65, is 0.5 or more but 5.0 or less,
   a maximum reflectance Rmax (450-700) in a wavelength region of 450 to 700 nm, measured on the eyeball-side surface of the spectacle lens, is 3.0% or less,
   a minimum reflectance Rmin (450-700) in a wavelength region of 450 to 700 nm, measured on the eyeball-side surface of the spectacle lens, is 0.5% or more, and
   the spectacle lens has a hue angle h, measured on the eyeball-side surface of the spectacle lens under a CIE standard illuminant D65, of 180.0 degrees or more but 300.0 degrees or less.

2. The spectacle lens according to claim 1, wherein a luminous reflectance Rv measured on the eyeball-side surface of the spectacle lens is 0.5% or more but 1.5% or less.

3. The spectacle lens according to claim 1, wherein an average reflectance Rm (450-700) in a wavelength region of 450 to 700 nm, measured on the eyeball-side surface of the spectacle lens, is 1.0% or more but 1.5% or less.

4. Spectacles comprising the spectacle lens according to claim 1.

5. The spectacles according to claim 4, wherein a luminous reflectance Rv measured on the eyeball-side surface of the spectacle lens is 0.5% or more but 1.5% or less.

6. The spectacles according to claim 4, wherein an average reflectance Rm (450-700) in a wavelength region of 450 to 700 nm, measured on the eyeball-side surface of the spectacle lens, is 1.0% or more but 1.5% or less.

* * * * *